May 30, 1933.    J. W. BROWN, JR    1,911,302
MULTIPLE OPERATION MULTIPLE SPINDLE DRILL
Filed Sept. 23, 1930    7 Sheets-Sheet 1

Patented May 30, 1933

1,911,302

UNITED STATES PATENT OFFICE

JOHN WILSON BROWN, JR., OF PHILADELPHIA, PENNSYLVANIA

MULTIPLE OPERATION MULTIPLE SPINDLE DRILL

Application filed September 23, 1930. Serial No. 483,952.

This invention relates to multiple spindle, multiple operation rotary cutting machines, and more particularly to a machine for drilling, or facing, or both, a plurality of circumferentially spaced portions on a given article.

A further and more specific object of the invention is the provision of an apparatus of this character wherein the article is placed in the jig upon a rotatable carrier which also bears spindles operating the tools for performing the desired operations, in which jig it remains during rotation of the carrier and during rotation of the carrier shifted in the jig to successively present the several portions for the necessary operation.

A still further object of the invention is the production of a novel and improved jig for machines of this character.

A still further object of the invention is to provide a controlling cam arrangement for shifting the movable element of a table and spindle in a machine of this character such that the movable element may carry the jig holding the work and the jig will always be properly presented to indexing mechanisms co-operating therewith to effect shifting of the work in presenting several surfaces thereof to the tools.

A still further object of the invention is to provide a novel and efficient means for supplying fluid pressure in a machine of this character to operate clamping elements of the jig.

A still further object of the invention is to provide a novel and improved multiple operation spindle mounting.

These and other objects I attain by the construction shown in the accompanying drawings wherein, for the purpose of illustration, I have shown a preferred embodiment of my invention and wherein.

Figures 1, 2:
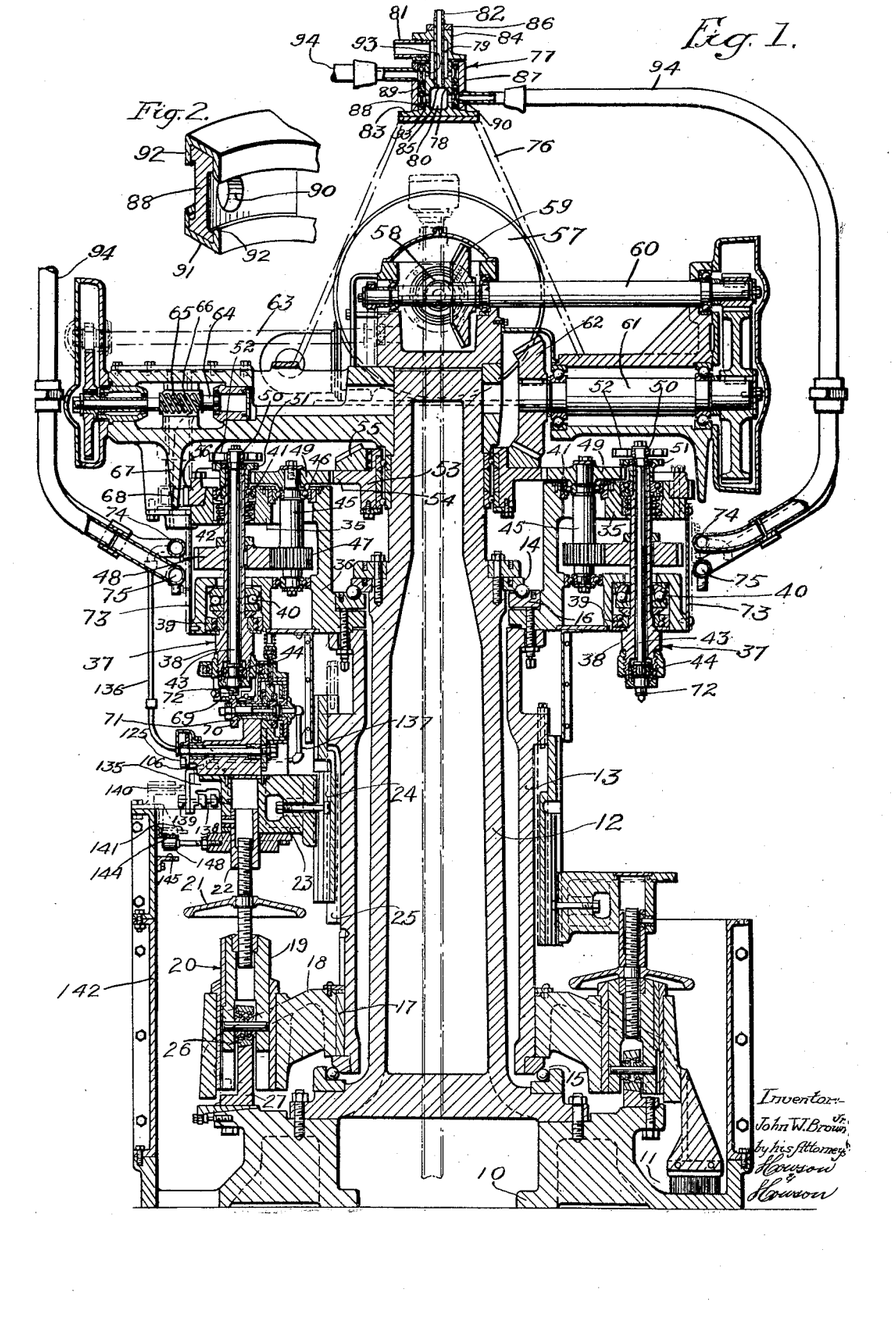
Fig. 1 is a vertical sectional view through a multiple spindle, multiple operation drilling machine constructed in accordance with my invention, certain of the operating elements being removed at one side of the machine to provide a clear indication of associated mechanisms.
Fig. 2 is a fragmentary perspective of a packing ring employed in conjunction with the fluid distributor.

Referring now more particularly to the drawings, the numeral 10 indicates a base, the outer portion of which is formed as an annular trough 11. The base centrally supports a standard 12 which is surrounded by a rotatable carrier 13 held in position by a radial thrust bearing 14 at its upper end and a step bearing 15 at its lower end. The carrier mounts an adjustable race 16 for thrust bearing 14 adjustment of which will remove any play of the carrier upon the standard. Secured to the lower portion of the carrier and held against rotation with relation thereto as by key 17 is a slide carrier 18 having vertically shiftably mounted therein the lower section 19 of a two-section slide 20, the sections of which are adjustably connected by a turnbuckle screw 21. The upper section 22 of this slide has a head 23 vertically adjustably mounted on a cross head 24 mounted on a guide 25 formed upon the outer face of carrier 13. The lower section 19 of each slide mounts a roller 26 for co-action with a cam 27 carried by the base. Cam 27 is formed in sections, the sections being preferably one more in number than the number of operations to be performed upon the article and being designated at 27—a, 27—b, 27—c, 27—d and 27—e.

Figures 10, 11, 12, 13:
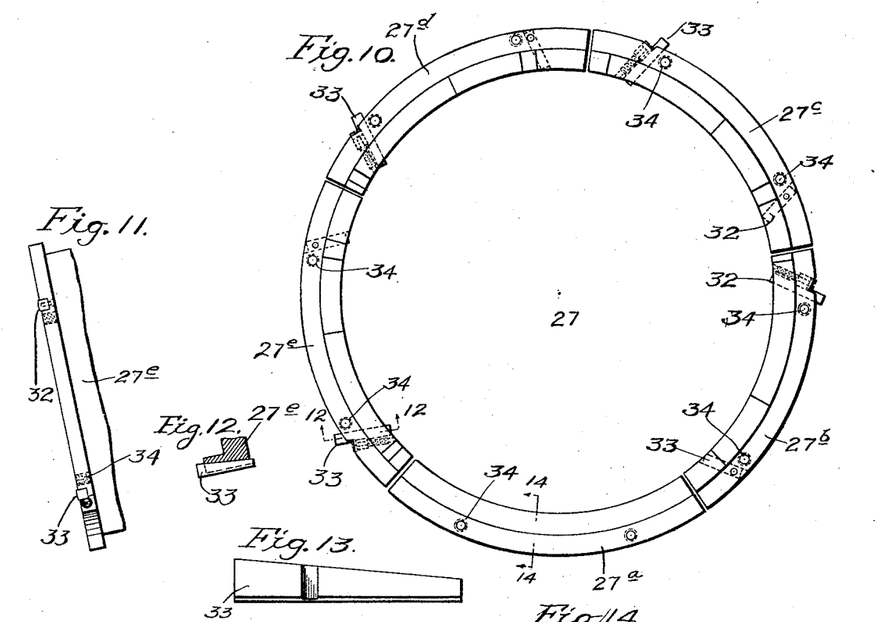
Fig. 10 is a plan view of the cam mechanism employed in controlling the raising of the work table.
Fig. 11 is a side elevation of the lower portion of one of the sections of the cam.
Fig. 12 is a section on line 12—12 of Fig. 10.
Fig. 13 is a side elevation of the wedge employed for adjusting the cam sections.
Figures 14, 15:
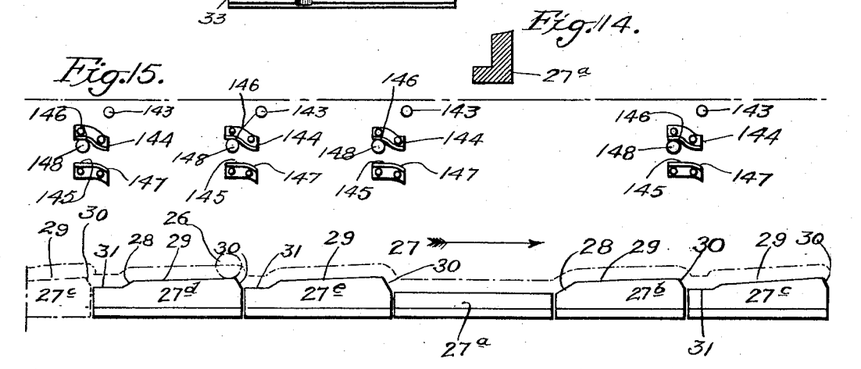
Fig. 14 is a section on line 14—14 of Fig. 10.
Fig. 15 is a diagram of the cam means controlling the table illustrating the approximate relation of the indexing mechanism for rotating the jig.

The section 27—a provides for a relatively long dwell during which treated articles may be removed and untreated articles substituted therefor and during which the slides 19 are disposed in their lowermost position. The operating sections 27—b, 27—c, 27—d and 27—e are substantially similar, each embodying a relatively sharp pitched rise 28, engagement of which by the cam causes the slide to be elevated fairly sharply to bring the work into engagement with the tools, a further gradually inclined surface 29 effective to gradually elevate the slide during cutting of the tool in performing the operation, and a relatively sharp decline 30 permitting shifting of the slide to an indexing position, the indexing position being represented in cams 27—c, 27—d, 27—e by the dwell 31. The section 27—a provides this index dwell between the sections 27—e and 27—b so that there is no necessity for this index dwell on the section 27—b.

Each operating section of the cam is mounted upon the base by providing at one end thereof a pivot block 32 engaging the base and at the opposite end thereof an adjustable wedge 33 which likewise engages the base. Screws 34 extending through a flange of the base and engaging each section serve to secure the cam in its adjusted position. The adjustment by means of the wedges permits graduation of both the speed and the depth of tool engagement with the article and by making each of the sections independently adjustable compensation may be had to some extent for unevenness in wear of the various parts affected.

The upper end of the carrier has a pair of vertically spaced flanges 35 and 36 overhanging the slides and having in alignment with the slides vertically aligned openings for the passage of spindle 37. Spindle 37 is at present illustrated as a multiple spindle comprising an outer section 38 rotatably mounted in the opening of flange 36 through a radial bearing 39 and a thrust bearing 40 and in the opening of flange 35 through a radial bearing 41 which is constantly urged upwardly by a spring 42 thus serving to remove vertical play from the spindle. The inner spindle 43 is rotatably mounted in the outer spindle section through upper and lower radial bearings 44. Paralleling each spindle 37 is a shaft 45 mounted in bearings 46 carried by the flanges 35 and 36. The shaft 45 has a pinion 47 engaging a gear 48 carried by the outer spindle section 38 and likewise has at its upper end a pinion 49 the purpose of which will hereinafter appear. The upper ends of spindle sections 38 and 43 have pinions 50 and 51 respectively, these pinions being connected by back gearing generally designated at 52 and mounted upon the stud carried by the upper flange 35.

Figure 3:
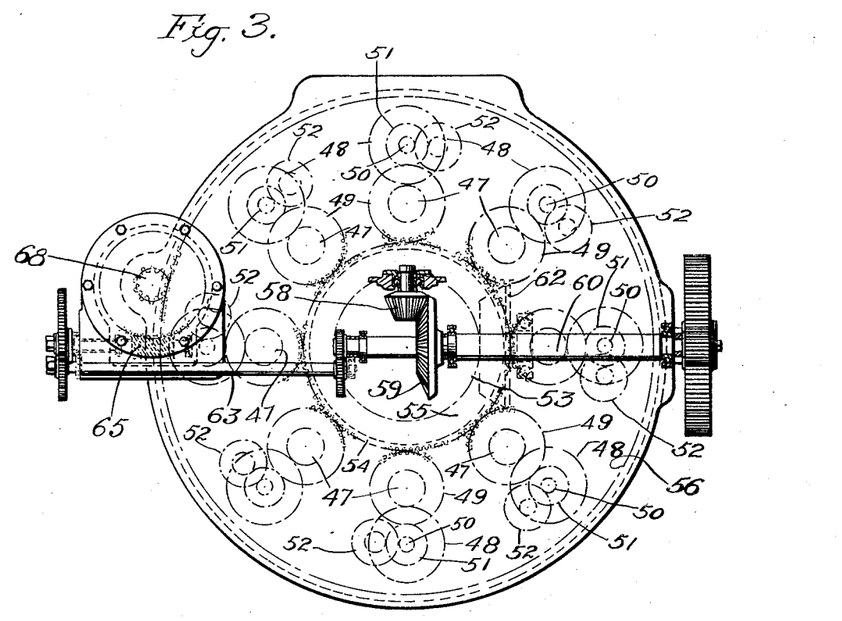
Fig. 3 is a partial plan of the machine showing the spindle driver.

Rotatably mounted upon the standard 12 is a compound gear element 53 including a ring gear 54 meshing with the pinions 49 and a bevel gear 55. Mounted upon the periphery of flange 36 is a ring gear 56. The upper end of standard 12 is in the form of a head mounting a motor 57. This motor, through a pinion 58 and a co-acting gear 59 carried by a shaft 60, drives the said shaft 60 and through said shaft a second shaft 61 the inner end of which has a bevel pinion 62 co-acting with the gear section 55 of compound gear 53. Shaft 60 likewise drives a shaft 63 which in turn drives a worm shaft 64, the worm 65 of which co-acts with the worm wheel 66 on a vertically-extending shaft 67 the lower end of which has a pinion 68 meshing with the ring gear 56. It will be obvious that through rotation of the motor the carrier is slowly rotated about the standard 12 and that gear 55 operating at a relatively higher speed drives the spindle sections 38 and 43 at different speeds, these speeds being regulated to suit the particular needs of the operations to be performed. The outer spindle, in the present instance, is shown as carrying cutters 69 for dressing the exteriors of hubs 70 of a universal joint ring 71, while the inner spindle carries a countersinking centering drill element 72 for center-drilling the outer ends of such hubs. It will, of course, be obvious that where desired a simple spindle may be provided instead of the compound spindle hereinbefore described. Flanges 35 and 36 are preferably connected by an annular cover plate 73 and by bars 73—a, which bars serve as a support for manifolds 74 and 75 at present employed for conducting respectively a coolant and a fluid pressure for operation of a jig fixture hereinafter more particularly described.

Figures 8, 9:
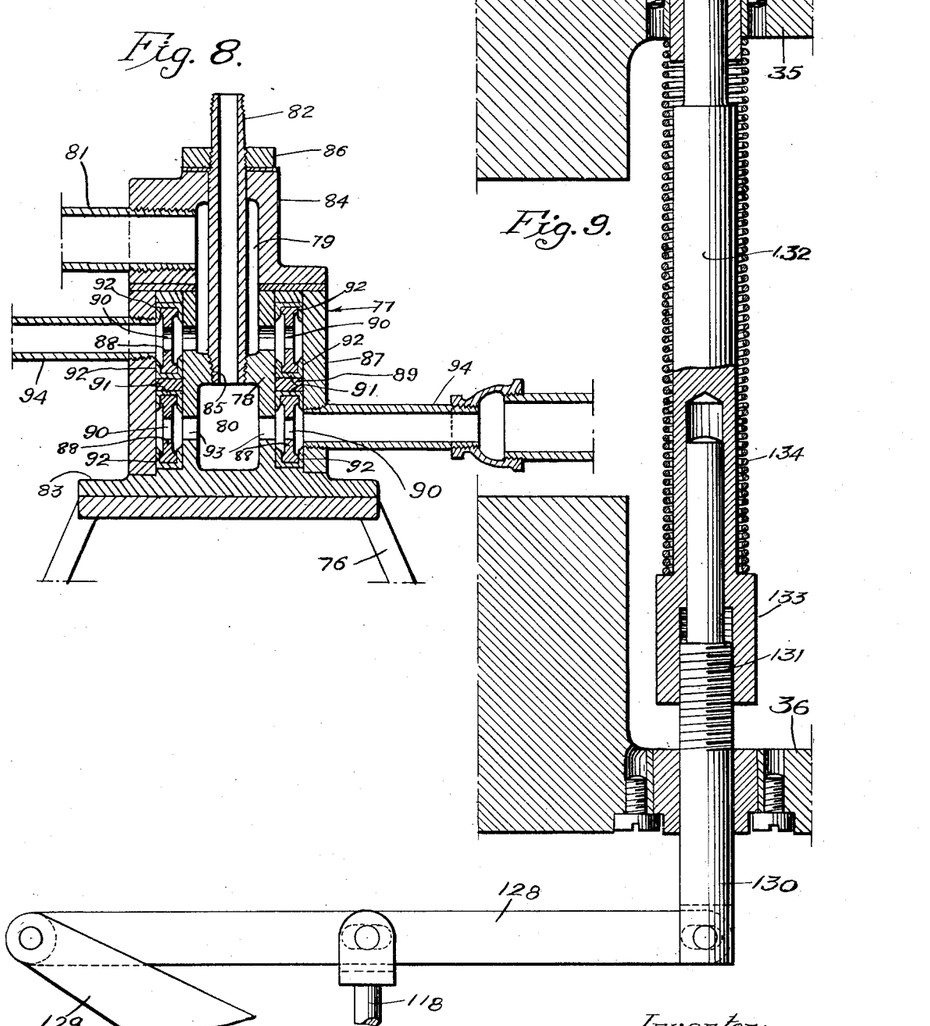
Fig. 8 is an enlarged sectional view through the fluid distributor.
Fig. 9 is a vertical sectional view through the latching apparatus for the jig.

Mounted upon the head of standard 12 through a suitable bracket 76 is a fluid pressure distributor generally designated at 77. This distributor comprises an inner stationary casing 78 partitioned to produce upper and lower chambers 79 and 80 with which communicate coolant or fluid pressure delivery pipes generally designated at 81 and 82 respectively, it being understood that either of these pipes may be employed for introducing either of the fluids referred to.

The inner casing 78 is formed in upper and lower sections, of which the lower section has the partition and is provided with a base 83 while the upper section is in the form of a cap 84. Pipe 82 enters the inner casing through the cap and is threaded into the partition as at 85. The projecting end of pipe 82 has a lock nut 86 seating upon the cap and holding the sections of the inner casing in assembled relation and this cap has a projecting rim overhanging the base. Rotatably surrounding the inner casing between the cap and the base, and in spaced relation to the outer wall thereof, is an outer casing 87. The space between the outer rotatable casing and the inner stationary casing is occupied by a pair of junk rings 88 spaced by a separator ring 89. Each junk ring is substantially I-shaped in cross section and has the web thereof perforated at spaced intervals as indicated at 90. The head and base sections of each junk ring seat in a channeled packing ring 91 the flanges 92 of which engage against the walls of the inner stationary casing and the outer rotatable casing respectively. Each junk ring aligns with one of compartments 79—80, and the space between the packing rings mounted thereon is in communication at its inner end with the aligned compartment while the corresponding space at the outer side of the ring is in communication with a conduit or conduits 94 leading to the associated manifold 74 or 75.

Figure 4:
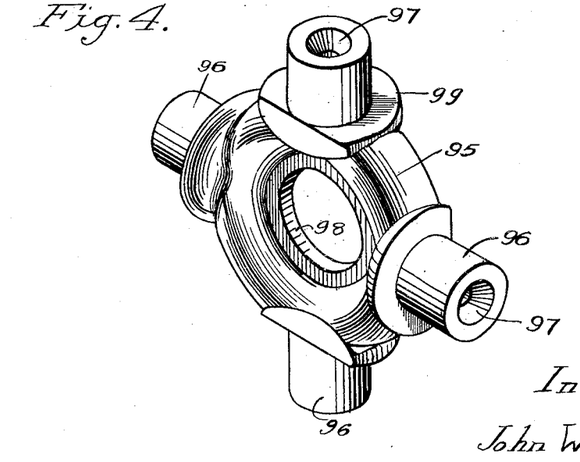
Fig. 4 is a perspective view illustrating the type of article which the machine is adapted to operate upon.
Figure 5:
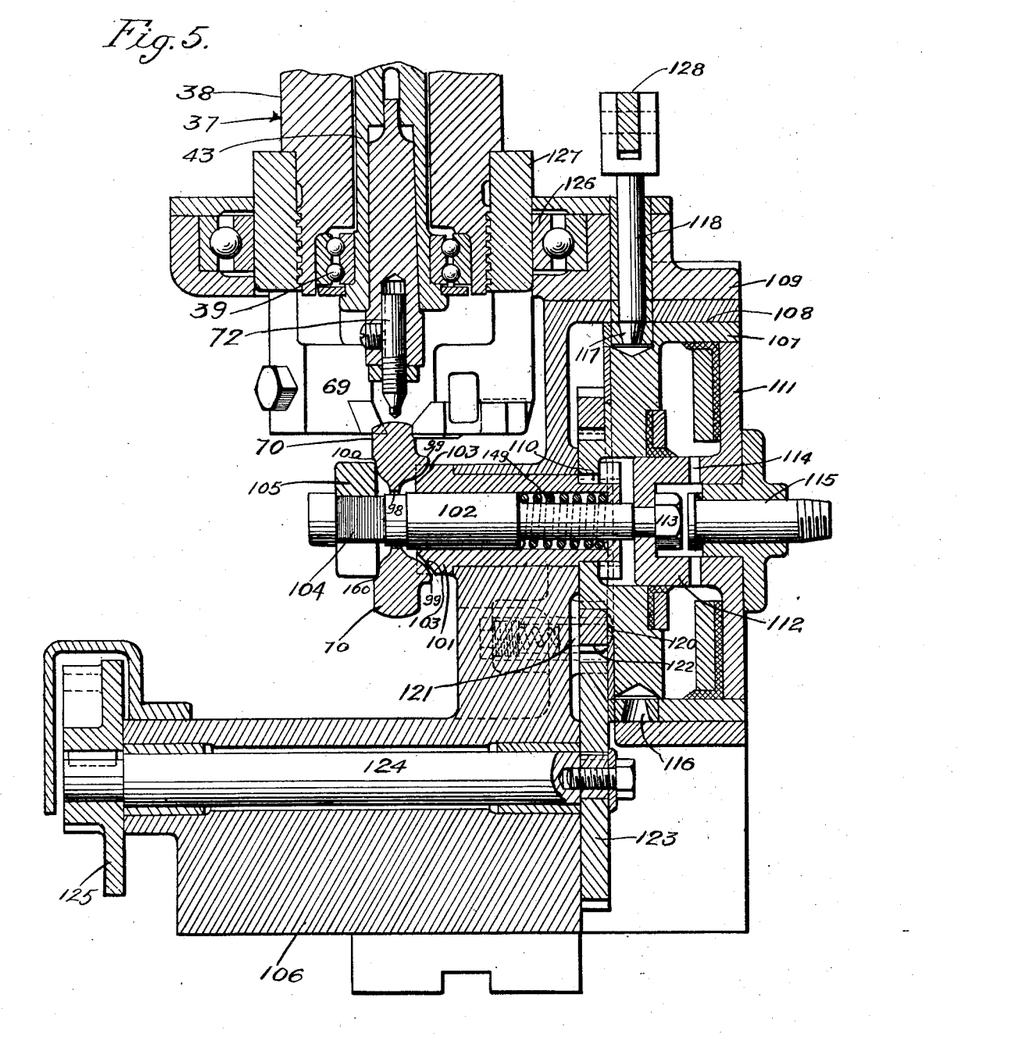
Fig. 5 is an enlarged vertical sectional view through the work-holding jig and the lower portion of the spindle.
Figure 6:
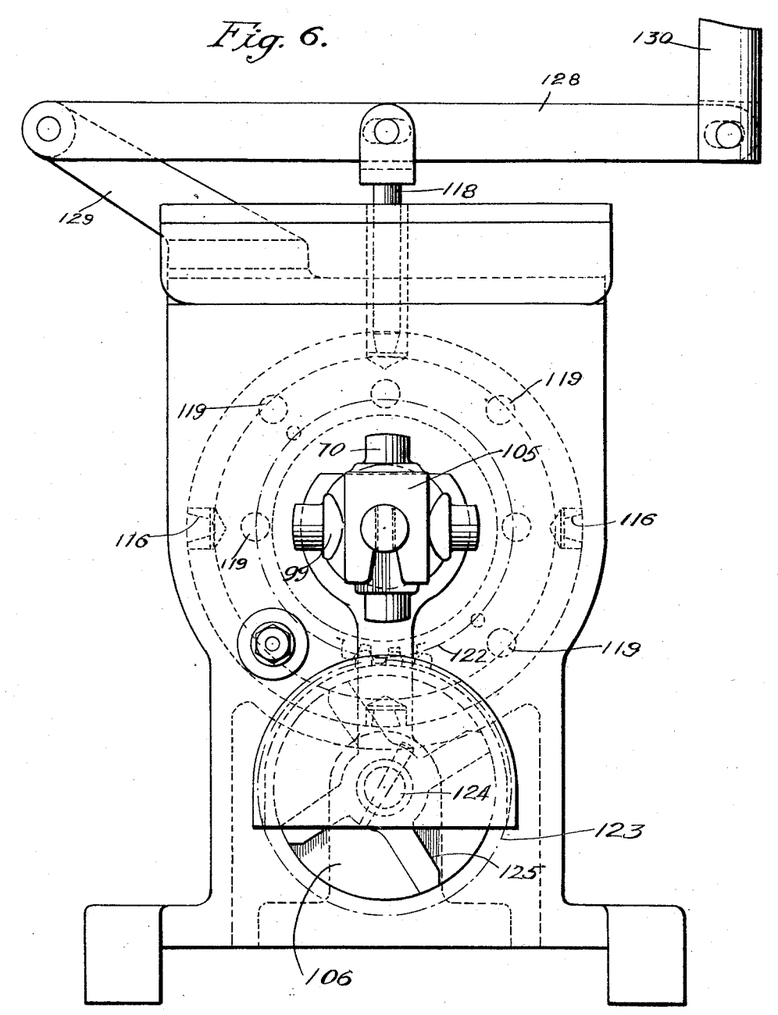
Fig. 6 is a front elevation of the jig.
Figure 7:
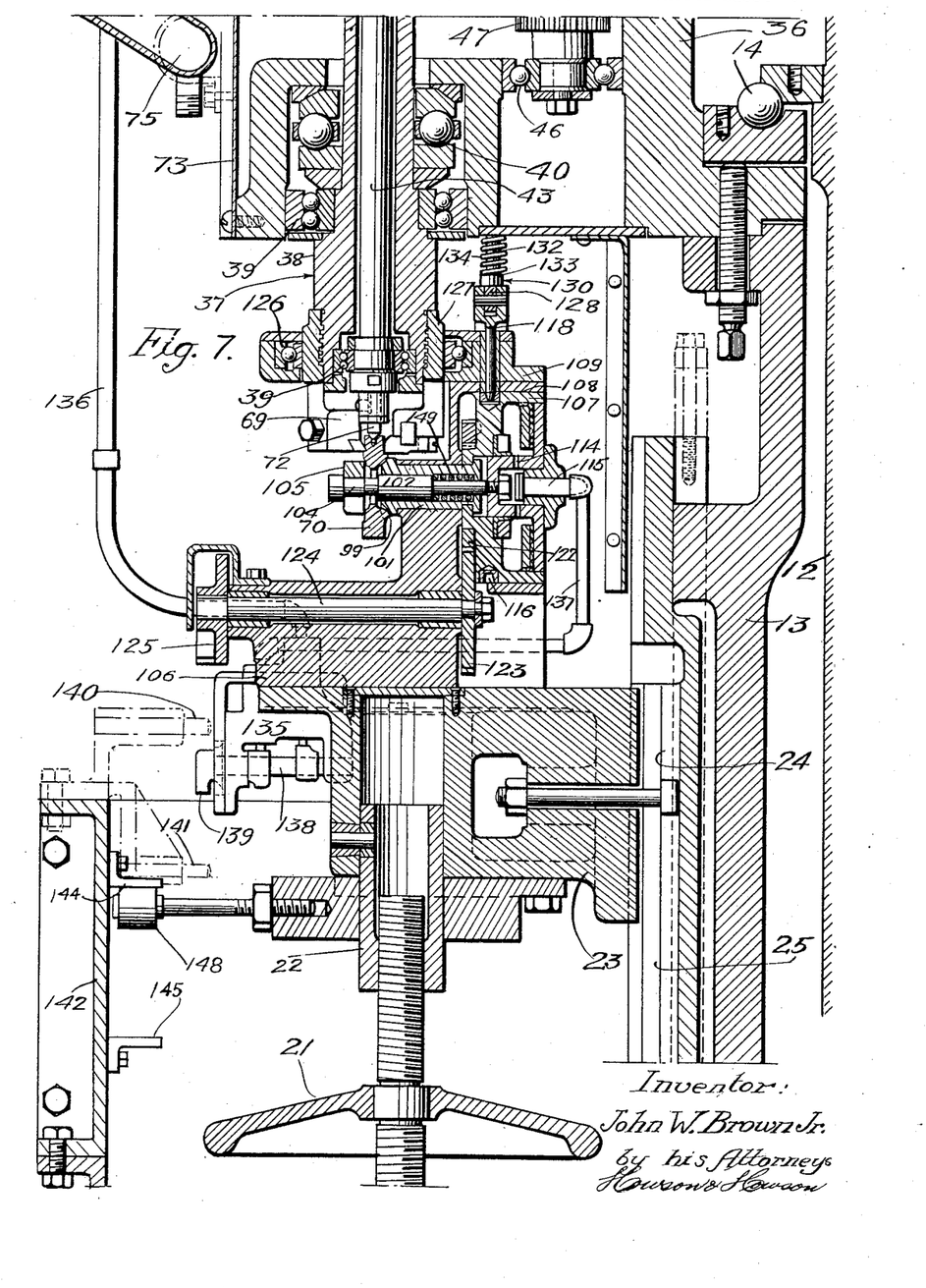
Fig. 7 is an enlarged vertical sectional view through a jig, the associated spindle and work table and associated portions of the machine.

The article at present illustrated as prepared by the machine comprises the ring 95 of a universal joint which has uniformly circumferentially-spaced hubs 96 which must be exteriorly dressed to a predetermined diameter, shouldered and provided with centering countersinks 97 in their outer ends. Such rings before delivery to the machine have the centers thereof bored as at 98. The base of each hub is defined by a partial flange which must be finished to provide a sealing shoulder. As a means for holding such an article, I provide a sleeve 101 through which is slidably directed a shaft 102, the outer end of which is adapted to readily pass through the opening 98 of the ring. The outer end of the sleeve is provided with notches 103 to receive diametrically-opposed projections 99 of the ring and the shaft adjacent its outer end is provided with flats 104 permitting the shaft to be straddled by a U-shaped clamping element 105 which is adapted to engage the outer face of the ring. It will be obvious that by projecting shaft 102 so that this washer or clamp 105 may be slipped from the shaft, the ring may be removed from, or placed over, the end of the shaft and the projections 99 engaged in the grooves. The washer, when in position will, if shaft 102 is drawn into the sleeve, serve to hold the ring in the projections 99 firmly seated in the notches and thus prevent rotation of the ring with relation to the sleeve. Obviously, the sleeve in the present instance is designed for engagement with a particular article, and different types of articles would necessarily be modified to engage their projecting portions which would assist in preventing rotation. The general structure hereinbefore set forth, however, is admirably adapted for use in jigging any ring-like structure. It will also be obvious that by rotating the sleeve 101, the several hubs 96 may be successively presented in a given position for the performance of work thereon.

As a means for controlling operation of shaft 102 and for rotating the sleeve, the following structure is provided:

A base 106 is mounted upon the head 23 and supports a horizontally-disposed cylinder 107. Cylinder 107 may have its inner end open and is rotatably mounted in a cavity 108 formed for its reception in a standard 109 arising from the base. At the front wall of the cylinder is a bore into which the rear end of sleeve 101 projects and is secured against longitudinal movement and rotation as at 110. A piston 111 of the cylinder is shown as having an enlarged hub 112 into which the rear end of shaft 102 extends and is secured as at 113 so that the shaft forms the stem of the piston. This hub, forwardly of the piston proper, has openings 114 extended therethrough and into communication with the space between the piston and the front wall of the cylinder and the cavity of this hub has extended thereinto a fluid pressure supply fitting 115. The periphery of the cylinder is provided with a series of notches 116 corresponding in number and arrangement to the hubs 96 of the article to be treated. These notches preferably taper inwardly so that by engagement therewith of the tapered inner end 117 of a locking pin 118 the position of the cylinder may be very accurately determined. The front wall of the cylinder has a corresponding series of shallow concave notches 119 in its front face for co-action with the rounded inner end 120 of a spring pressed detent 121 serving as a temporary locking means. This detent engages in the notches with which it co-acts with such force that it may be displaced during process of alignment of the cylinder by the locking pin 118. The front wall of the cylinder has secured thereto a gear 122 meshing with a pinion 123 carried by the inner end of a shaft 124 mounted in the base 106 and having at its outer end a star wheel 125. The upper portion of the cylinder wall provides a guide for the locking pin and additionally affords a mounting for a bearing 126 in the inner race of which the lower end of the outer spindle section is vertically shiftably mounted. In the present instance a portion directly engaging this race is shown as a sleeve 127 threaded upon the outer spindle section and supporting the cutters 69. Locking pin 118 is engaged at its upper end with a lever 128 which is pivoted upon a bracket 129 carried by the cylinder at one end and at its opposite end has engagement with a control rod 130. This control rod 130 which is made in two threadedly-connected sections, 131 and 132, has the section 131 thereof slidably mounted in the lower flange 36 of the carrier and the section 132 in the upper flange 35 thereof. The section 132 has an enlarged head 133 between which and the upper flange 35 a spring 134 surrounds this section. This spring tends to maintain the lower end of head 133 in engagement with flange 36 and the rod 130 in a lowered position. Likewise secured to the base 106 is an air valve 135, the internal structure of which is relatively unimportant since any valve which is capable of controlling admission of fluid pressure to the cylinder and exhaust thereof therefrom will suffice. In the present instance, this valve is shown as connected through conduits 136 and 137 embodying flexible sections with the manifold 74 and with the cylinder. The control stem 138 of the valve is provided with control arms 139 projecting for co-action with operating stops 140 and 141 carried by a guard rail 142 arising from the outer wall of the trough 11. The same guard rail bears trips 143 for actuation of the star wheel 125, these trips corresponding in number and arrangement to the indexing dwells 31 of the cam sections, it being understood that the section 27 is considered as having such a dwell. Since it will often occur that due to adjustment of the slide 20 as to length to overcome some error in the operation at a particular station, these stops would be improperly positioned for co-action with either the valve-operating arms 139 or the star wheel 125, I provide upon the inner face of the guard rail at each index period a cam means for insuring proper alignment. This cam means includes an upper cam section 144 and a lower cam section 145. The upper cam section, which is slightly in advance, has a downwardly-inclining camming face 146 at the initially-engaged end thereof while the lower cam section has a downwardly-inclining shed 147 at its tail. The remaining portions of the cam 144 and 145 which oppose one another receive in the channel therebetween a roller member 148 supported from the head 23 and thus maintain the head in a given position during passage of the index pin or stop. The downwardly-inclining section of the upper cam serves to draw the head downwardly in event it fails to drop by gravity while the tail portion 147 of the cam 145 determines the period at which the slide can move to its lowermost position as determined by the cam. The actual position in which the slides are held during indexing operations is such that the lower slide roller 26 is actually out of engagement with the cam 27.

It will be understood that the mechanism described in conjunction with the slides, spindles, clamping mechanism and the associated parts is duplicated in series about the machine, such mechanisms preferably being two in number for each operation which is to be performed; thus, a machine having four operations, as in the present instance, would have 8 spindles with their associated slides, clamping mechanisms and controls.

In the operation of the machine, when a given slide is engaged with section 27—a of the cam, it is in its lowermost position, the table and the jig being lowered so that the article upon which the operations are being performed is free from engagement in the tools and may be removed. At this time fluid pressure is relieved from cylinder 107 with the result that the piston moves forwardly under the influence of a spring 149 operating between the shoulder at the inner end of the sleeve and a shoulder of shaft 102 and the clamping washer 105 is freed so that it may be removed and the ring slipped from shaft 102 and substituted by another ring. The operator places this ring in position and inserts the washer 105 while the machine is moving. As the machine arrives at the end of the section 27—a the proper stop 141 engages the valve arm 139 admitting fluid pressure to cylinder 107. The piston moves rearwardly, with the result that washer 105 clamps against the ring securing it in position. The cam section 27—b now acts first to raise the table so that the hub which aligned with the tools of the associated spindle is engaged by these tools and then gradually feeds the head upwardly until the desired operation has been performed on the hub. Reaching the decline 30 of the cam, the table lowers rapidly, and pin 118 is disengaged from the notch 116 with which it has been previously engaged, due to the fact that the head 133 of the control rod has come into engagement with flange 36 limiting its downward movement and the table has continued to drop. As soon as the pin 118 is disengaged the roller 148 of the work table engages between a pair of cams 144, 145, insuring lowering of the table to the proper point, and the star wheel 125 comes in engagement with the index pin with the result that shaft 124 is rotated. Rotation of shaft 124 through pinion 123 and gear 122 rotates the cylinder through one-quarter of a revolution at the end of which the index pin is disengaged from the star wheel and the spring pressed plunger 121 is engaged in a concavity 119. The table now engages a raise 28 of the cam with the result that the table moves upwardly and pin 118 once again engages in a notch locking the cylinder against rotation. A fresh hub is thus presented to the tools of the spindle and the operation performed thereon, this operation being repeated until each of the hubs has been presented at which time the slide is again opposed to cam section 27—a. As it comes into engagement with the cam section 27—a, the fluid pressure is again cut off from and exhausted from the cylinder so that the spring may effect release of the finished article.

It will be obvious that while in the present instance the hubs are perpendicular to the axis, the machine may be readily adapted if desired for use with a structure wherein the hubs are parallel to the axis or at any angle between parallel and perpendicular thereto, it being merely necessary to shift the cylinder 107 so that its axis is properly inclined and to modify the control means to adapt them to the new position of the cylinder.

While I have above stated that the indexing operations occur once for each number of operations which is to be performed upon the article, this, in the present structure, is desirable due to the fact that the particular type of clamp employed with the jig is most easily manipulated when presented to the operator in a given position. Obviously, in some instances these clamps will be of such character, that the position of the jig when presented to the operator for removal and replacement of the articles acted upon, that it will be unnecessary that they be in any given position and in such instances the number of indexing operations will be reduced by one. Furthermore, while I have specified the use of cams for positively withdrawing the work tables so that they may be accurately presented to the indexing means, it will be obvious that in some instances the use of such cams may be eliminated and the forces of gravity employed for withdrawing the work table.

Since the structure is otherwise capable of a considerable range of change and modification without in any manner departing from the spirit of my invention, I do not wish to be understood as limiting myself thereto except as hereinafter claimed.

I claim:

1. In a multiple operation rotary drilling machine for operating on articles having a plurality of circumferentially spaced members, each to receive an operation, a stationary standard, a rotatable carrier mounted thereon, a group of work supports carried by the carrier, a group of rotary cutting implements carried by the carrier and each permanently aligned with one of said work supports for co-action with the articles carried thereby, means for independently shifting the elements of one of said groups to bring the articles into engagement with the cutting implements, a rotatable jig carried by each work support for directly supporting the articles, means for separating the work supports and the cutting implements after each operation, means for rotating the jig while the cutting implements and the article are out of engagement with one another and means for positively holding the jig in predetermined positions between rotations thereof.

2. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, means for independently shifting the elements of one of said groups to bring the articles into engagement with the cutting implements, a rotatable jig carried by each work support for directly supporting the articles, means for separating the work supports and the cutting implements after each operation, means for rotating the jig while the cutting implements and the article are out of engagement with one another, resilient latching means for holding the jig in its adjusted positions and positive latching means operative upon movement of the elements of the movable group toward the elements of the other group for latching the jig in adjusted positions.

3. In a machine for operating upon articles having a plurality of circumferentially-spaced members, each to receive an operation, a jig comprising a standard, a cylinder rotatably mounted thereon, a piston in the cylinder and having a stem projecting through an end wall thereof, means carried by said end wall and the stem for clamping the article upon movement of the piston as a result of introduction of fluid pressure to the cylinder, means for rotating the cylinder and means for locking the cylinder in rotatably adjusted positions.

4. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, means for independently shifting the elements of one of said groups to bring the articles into engagement with the cutting implements, a rotatable jig carried by each work support for directly supporting the articles, means for separating the work supports and the cutting implements after each operation, means for rotating the jig while the cutting implements and the article are out of engagement with one another, and latching means for latching the jig in adjusted positions yieldable in the direction of movement of the movable group.

5. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, means for independently shifting the elements of one of said groups to bring the articles into engagement with the cutting implements, a rotatable jig carried by each work support for directly supporting the articles, means for separating the work supports and the cutting implements after each operation, means for rotating the jig while the cutting implements and the article are out of engagement with one another, a yieldable detent for holding the jig in its adjusted positions and means mounted for yielding movement in the direction of movement of the movable group for positively latching the jig in adjusted positions.

6. In a multiple operation rotary cutting machine for operating on articles having a plurality of circumferentially-spaced members each to receive an operation, a rotatable structure, a work support and a cutter carried thereby and mounted for relative movement to permit the work to be brought into operative engagement with the cutter, means for periodically causing such relative movement as the support is rotated, a jig carried by the work support for clamping the work in position thereon and mounted for rotation upon the work support to serially present the members of the article for the operation, means for rotating the jig when the drill and work table are separated and means for locking the jig when the table aproaches the cutter rendered operative by the relative movement of the work table and cutter.

7. In a multiple operation drilling machine for operating on articles having a plurality of circumferentially-spaced members each to receive an operation, a rotary cutting tool, a work table movable toward and away from the cutting tool, means for periodically shifting the table, a rotatable jig carried by the table and embodying means to clamp the work, means for rotating the jig at each separation of the work table from the cutter and means for locking the jig against rotation rendered operative by the approach of the work table to the cutter.

8. A clamping device for supporting articles having a plurality of radially-disposed members each to receive an operation and having a central aperture, said clamping device comprising a rotatable sleeve having at one end a formed seat against which one face of the article may be disposed, a shaft mounted in the sleeve and having a head, yieldable means normally maintaining said head in spaced relation to said end of the sleeve, means for positively moving the shaft in a direction to cause approach of the head toward said end of the sleeve and a yoke to straddle the shaft inwardly of the head and adapted to bear against the outer face of the article and force it into engagement with the seat of the sleeve thereby holding the article against rotation with relation to the sleeve.

9. A clamping device for supporting articles having a plurality of radially-disposed members each to receive an operation and having a central aperture, said clamping device comprising a rotatable sleeve having at one end a formed seat against which one face of the article may be disposed, a shaft mounted in the sleeve and having a head, yieldable means normally maintaining said head in spaced relation to said end of the sleeve, means for positively moving the shaft in a direction to cause approach of the head toward said end of the sleeve, a yoke to straddle the shaft inwardly of the head and adapted to bear against the outer face of the article, the means for moving said shaft comprising a piston and a cylinder for said piston mounted for rotation and fixed to said sleeve and force it into engagement with the seat of the sleeve thereby holding the article against rotation with relation to the sleeve.

10. In a multiple operation rotary cutting machine, a stationary standard, a rotatable carrier mounted thereon, a group of work supports carried by the carrier, a group of rotary cutting implements carried by the carrier and each aligned with one of said work supports for co-action with work carried thereby, means for independently shifting the elements of one of said groups to bring the work into engagement with the cutting implements comprising a cam having sections corresponding in number to the number of operations to be performed, each section being independently adjustable to determine the extent of such engagement, a guard rail fixed with relation to the standard and surrounding the elements of the movable group and cams carried by said guard rail for shifting the elements of said group in the opposite direction after co-operation of the cutting elements with the work.

11. In a multiple operation rotary cutting machine, a stationary standard, a rotatable carrier mounted thereon, a group of work supports carried by the carrier, a group of rotary cutting implements carried by the carrier and each aligned with one of said work supports for co-action with work carried thereby, means for independently shifting said work supports to bring the work into engagement with the cutting elements, a rotatable jig carried by each work support, a member fixed with relation to the standard for indexing rotation of said jig and means for positively moving the work supports in the opposite direction to insure co-action of said member with said jig.

12. In a multiple spindle rotary drilling apparatus, a stationary standard, a rotatable carrier mounted thereon, aligned drills and work supports carried by said carrier, a fluid-pressure-operated jig carried by each work support and means for delivering coolant to said drills and fluid pressure to said jigs comprising a distributor including a stationary part supported from the standard and a rotating part, and conduits supported from the carrier and connected with said rotating part.

13. In a distributor for the purpose described, relatively rotatable elements affording an annular chamber therebetween and each having openings communicating with said chamber, an annular member of I-shaped cross section disposed in said channel and having the web thereof perforated and the flanges thereof disposed above and below the level of the openings of said members and annular packings of channeled cross section seated upon the flanges of said annular member.

14. In a rotary cutting machine, a stationary standard, a rotatable carrier mounted thereon, a group of work supports carried by the carrier, a group of rotary cutting implements carried by the carrier and each aligned with one of said work supports for co-action with work carried thereby, means for independently shifting the elements of one of said groups to bring the work into engagement with the cutting implements a guard rail fixed with relation to the standard and surrounding the elements of the movable group and cams carried by said guard rail for shifting the elements of said group in the opposite direction after co-operation of the cutting elements with the work.

15. In a rotary cutting machine, a stationary standard, a rotatable carrier mounted thereon, a group of work supports carried by the carrier, a group of rotary cutting implements carried by the carrier and each aligned with one of said work supports for co-action with work carried thereby, means for independently shifting said work supports to bring the work into engagement with the cutting elements, a rotatable jig carried by each work support, a member fixed with relation to the standard for indexing rotation of said jig and means for positively limiting separation of the work supports from the cutting implements to insure co-action of said member with said jig.

16. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, means for independently shifting the elements of one of said groups to bring the articles into engagement with the cutting implements, a rotatable jig carried by each work support for directly supporting the articles, and means for rotating the jig while the cutting implements and the article are out of engagement with one another.

17. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, means for independently shifting the elements of one of said groups to bring the articles into engagement with the cutting implements, a rotatable jig carried by each work support for directly supporting the articles, means for rotating the jig while the cutting implements and the article are out of engagement with one another, and positive latching means operative upon movement of the elements of the movable group toward the elements of the other group for latching the jig in adjusted positions.

18. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, means for independently shifting the elements of one of said groups to bring the articles into engagement with the cutting implements, a rotatable jig carried by each work support for directly supporting the articles, means for rotating the jig while the cutting implements and the article are out of engagement with one another, and latching means for latching the jig in adjusted positions yieldable in the direction of movement of the movable group.

19. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, a rotatable jig carried by each work support for directly supporting the articles, means for rotating the jig while the cutting implements and the article are out of engagement with one another, a yieldable detent for holding the jig in its adjusted positions and means mounted for yielding movement in the direction of movement of the movable group for positively latching the jig in adjusted positions.

20. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, means for independently shifting the elements of one of said groups to bring the articles into engagement with the cutting implements, a rotatable jig carried by each work support for directly supporting the articles, means for separating the work supports and the cutting implements after each operation, means for rotating the jig while the cutting implements and the article are out of engagement with one another, and means for positively maintaining the jig in accurate alignment with the work holder in each of its rotatably adjusted positions.

21. In a multiple operation rotary drilling machine for operating on articles having a plurality of circumferentially-spaced members, each to receive an operation, a stationary standard, a rotatable carrier mounted thereon, a group of work supports carried by the carrier, a group of rotary cutting implements carried by the carrier and each aligned with one of said work supports for co-action with the articles carried thereby, means for independently shifting the elements of one of said groups to bring the articles into engagement with the cutting implements, a rotatable jig carried by each work support for directly supporting the articles, means for separating the work supports and the cutting implements after each operation, means for rotating the jig while the cutting implements and the article are out of engagement with one another, and latching means for positively latching the jig in accurate alignment with the associated cutting implement in each of the adjusted positions of the jig.

22. In a multiple operation drilling machine for operating on articles having a plurality of circumferentially-spaced members each to receive an operation, a rotary cutting tool, a work table movable toward and away from the cutting tool, means for periodically shifting the table, a rotatable jig carried by the table and embodying means to clamp the work, means for rotating the jig at each separation of the work table from the cutter, and means for locking the jig in accurate alignment with said cutting tool in each of the rotated positions of the jig.

23. In a rotary cutting machine, a revolving spindle continuously rotating about an axis, a cutting tool carried by said spindle, a rotatable work holder rotating synchronously with said spindle about the same axis and permanently aligned with the spindle, means for intermittently relatively shifting said spindle and said work holder during each rotation about said axis to bring the work into and out of engagement with the tool, means for intermittently revolving the work holder about its own axis during each rotation about the first-named axis to thereby present different articles held by said work holder serially to the action of said cutting tool, means to clamp work to the work holder, and means to automatically release said clamping means on the completion of a rotation about the first-named axis.

24. In a rotary cutting machine, a revolving spindle continuously rotating about an axis, a cutting tool carried by said spindle, a rotatable work holder rotating synchronously with said spindle about the same axis and permanently aligned with the spindle, means for intermittently relatively shifting said spindle and said work holder during each rotation about said axis to bring the work into and out of engagement with the tool, means for intermittently revolving the work holder about its own axis during each rotation about the first-named axis to thereby present different articles held by said work holder serially to the action of said cutting tool, means to clamp work to the work holder, means to automatically release said clamping means on the completion of a rotation about the first-named axis, and means to latch the work holder in accurate alignment with the cutting tool in each of its rotatably adjusted positions.

25. In a machine for operating upon articles having a plurality of circumferentially spaced members each to receive an operation, a jig comprising a standard, a cylinder rotatably mounted thereon, a piston in the cylinder and having a stem projecting through the end wall thereof, means carried by said end wall and the stem for clamping an article upon movement of the piston in one direction, automatic means for moving the piston in one direction, and fluid pressure means for moving the piston in the opposite direction.

JOHN WILSON BROWN, Jr.